United States Patent [19]

Aquilante

[11] Patent Number: 4,971,377
[45] Date of Patent: Nov. 20, 1990

[54] EFFICIENT FOOD DELIVERY SYSTEM

[76] Inventor: Anthony Aquilante, P.O. Box 760, Valley Forge, Pa. 19482

[21] Appl. No.: 485,846

[22] Filed: Feb. 21, 1990

Related U.S. Application Data

[63] Continuation of Ser. No. 233,233, Aug. 17, 1988, abandoned.

[51] Int. Cl.$^5$ ............................................. B60P 3/025
[52] U.S. Cl. ..................................... 296/22; 105/327
[58] Field of Search ................. 296/22, 24.1; 105/327

[56] References Cited

U.S. PATENT DOCUMENTS

| | | | |
|---|---|---|---|
| 458,738 | 9/1891 | Palmer | 296/22 |
| 780,265 | 1/1905 | Closson | 296/22 |
| 1,333,670 | 3/1920 | Moseley | 296/24.1 |
| 1,372,854 | 3/1921 | Wieman | 296/24.1 |
| 1,379,463 | 5/1921 | Martin | 296/24.1 |
| 1,689,900 | 10/1928 | Williams | 105/327 |
| 1,779,082 | 10/1930 | Barriàre | 98/32 |
| 2,281,581 | 5/1942 | Horton | 105/327 |
| 2,982,578 | 5/1961 | Lowe | 296/22 |
| 3,991,739 | 11/1976 | Hoffman, Jr. | 126/268 |
| 3,997,028 | 12/1976 | Lopez | 312/306 X |
| 4,184,433 | 1/1980 | Green | 105/327 |
| 4,270,319 | 6/1981 | Spasojevic | 296/22 X |
| 4,601,509 | 7/1986 | Ellis, Sr. | 296/22 |
| 4,666,204 | 5/1987 | Reinholtz | 296/24.1 |

FOREIGN PATENT DOCUMENTS 605206  9/1978  Switzerland ........................ 296/22

OTHER PUBLICATIONS

Motor Vehicle Monthly, Oct. 1922, p. 16.

Primary Examiner—Dennis H. Pedder
Attorney, Agent, or Firm—Ratner & Prestia

[57] ABSTRACT

Food service vehicle and method comprising a bus-like vehicle with aisleway extending substantially the length of the vehicle between a front entrance door in the front of the vehicle and a rear customer exit door at the rear of the vehicle. Food service counters disposed along the length of the aisleway permit serving of customers in an efficient manner. Cabinets located under the counters permit provisioning the vehicle at a remote food preparation facility and then transporting both food and vehicle, including the efficient service area provided in the vehicle to a remote location, such as an office building, airport service terminal, or an outdoor event such as a wedding or golf tournament.

8 Claims, 2 Drawing Sheets

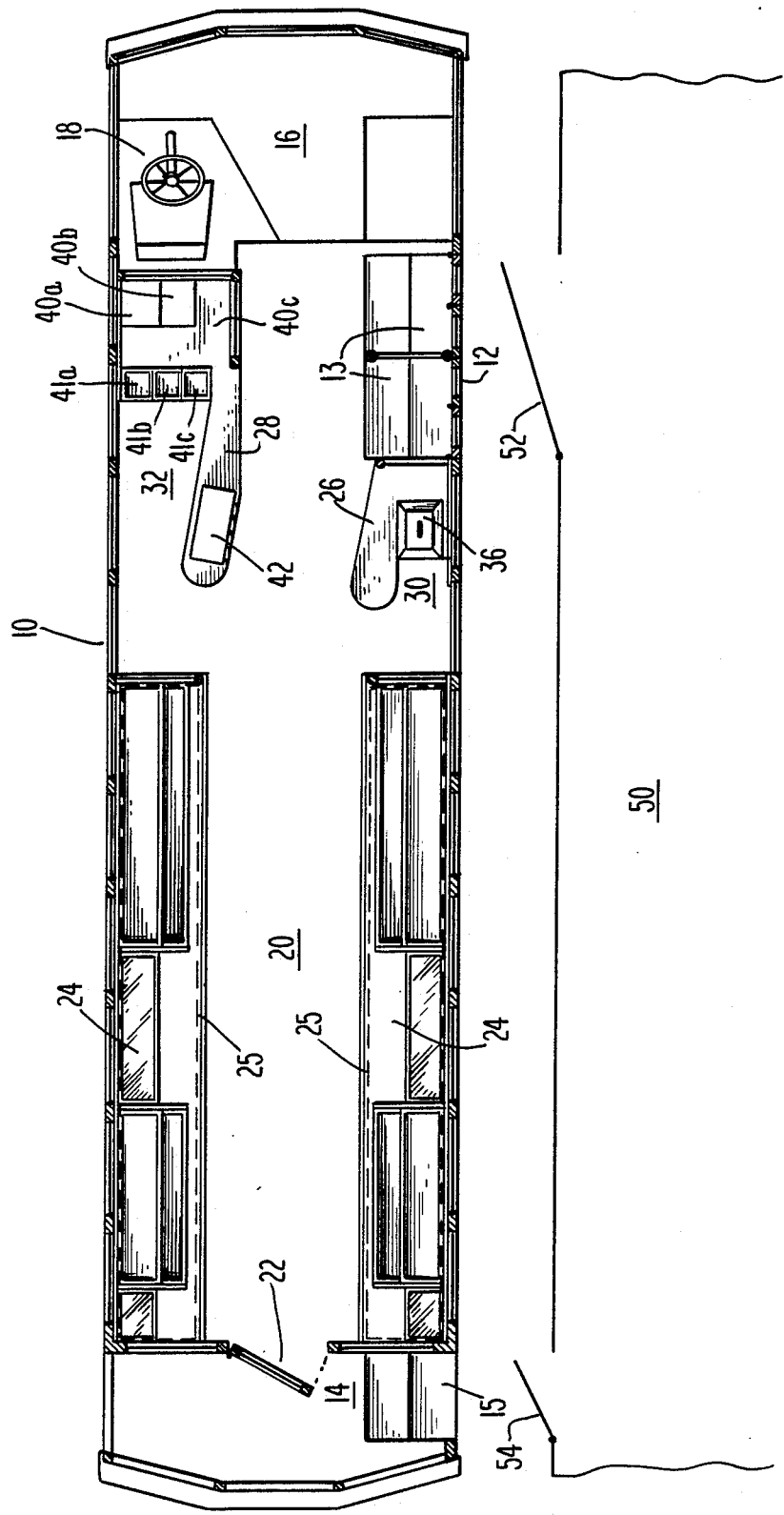

EFFICIENT FOOD DELIVERY SYSTEM

This application is a continuation of application Ser. No. 07/233,233 filed 8/17/88, abandoned.

BACKGROUND OF THE INVENTION

This invention pertains to a vehicle especially adapted to serve as an efficient food delivery system and a method for more efficient food delivery using such a vehicle. Particularly, this invention pertains to such a vehicle and method adapted to permit the food to be preserved and presented in an efficient and attractive way, and to be served efficiently.

Many food serving systems have been devised to feed large numbers of people efficiently. Typically, the more efficient these systems, the less attractive and inviting is the presentation of the food served. An example of this is the food service cafeterias in modern office buildings. Business owners and commercial landlords in general find it difficult to provide food service for employees and occupants which is both economical and attractive.

The present invention was developed to try to meet these needs with a food service vehicle devoted entirely to food service (not preparation) and which is periodically transported to the point of need for such a facility. The general objective is to provide a food service system which is efficient and which facilitates high quality food presentation in an attractive and inviting environment.

For further background reference is made to the Information Disclosure Statement, pertaining to known prior art references, which follows:

INFORMATION DISCLOSURE STATEMENT

The following patents were located in a search directed to the invention disclosed and claimed herein.

U.S. Pat. No. 4,601,509—Ellis

This patent discloses a tractor trailer vehicle in which the trailer includes a relatively short food service area including entrance and exit doors, by which food service customers enter, pass through the food service area and exit. This food service area comprises a relatively small part of the overall tractor unit, most of which is devoted to food preparation.

U.S. Pat. No. 4,666,204—Reinholtz

This patent discloses a bus with a very small food preparation and service area in the rear. Substantially the entire remaining internal area of the bus is devoted to booth and tables, for food serving and consumption.

U.S. Pat. No. 4,270,319—Spasojevic

This patent discloses a mobile vending booth in which food service is rendered from the internal part of the vehicle and means are provided for a customer walkway external to the food preparation areas with paths through the vehicle body, by which food is passed from the food service preparation area to the customers of the vehicle's exterior.

U.S. Pat. No. 4,184,433—Greene

Discloses food presentation counters for use in a railway passenger vehicle.

U.S. Pat. No. 458,738—Palmer

Discloses a lunch wagon in which food is prepared and served. Customers enter and exit through a single door and no particular flowpath is evident.

U.S. Pat. No. 780,265—Closson

Discloses a towed vehicle having both food preparation and food service and consumption areas. Customers appear to enter and exit through a single door. No special customer flowpath is evident.

U.S. Pat. No. 3,997,028—Lopez

Discloses food service counters having means for holding food in both hot and cold conditions.

U.S. Pat. No. 3,991,739—Hoffman

Discloses a vehicle mounted food preparation apparatus. It does not appear that there is any internal area through which customers pass.

U.S. Pat. No. 1,779,082—Barriere

A diner-type vehicle with no specific customer traffic pattern disclosed.

Of the foregoing, none except Ellis disclose a food service vehicle including customer entrance and exit doors and food service along an aisle-way between the doors and none suggest a vehicle in which substantially the entire vehicle is utilized for food storage and presentation.

No representation is made that the foregoing represents the best available prior art. It is however the only prior art known to applicant and was located in a search directed to this invention.

BRIEF DESCRIPTION OF THE INVENTION

Briefly, the present invention comprises a food service vehicle, preferably a bus, with a customer entrance near the front of the vehicle, a customer exit door near the rear of the vehicle, and a customer aisleway extending from the front to the rear, with food service counters, primarily self-service food counters, along the aisleway. In accordance with the method of this invention, relatively large numbers of customers can be provided food service in an efficient manner by preparing the food off site, and then storing and dispensing it in an attractive food service counter, primarily self-service counters, which together with an aisleway occupy substantially all of the interior space in a self-propelled vehicle. This facilitates transporting the vehicle to the site where efficient and attractive food service is desired.

Most preferably the food service counters along the customer aisleway in the vehicle of this invention also include at least one, preferably two, attendant-serviced, food preparation and service areas in which, for example, previously prepared hot food may be dispensed, and/or individual portions of meat or fish may be sliced and/or served with appropriate sauces.

For a better understanding of this invention, reference is made to the sub-joined claims and to the detailed description which follows, taken in conjunction with the accompanying figures.

BRIEF DESCRIPTION OF THE FIGURES

FIG. 2 is a floor plan of the vehicle shown in FIG. 1.

DETAILED DESCRIPTION OF THE INVENTION

Figure 1:
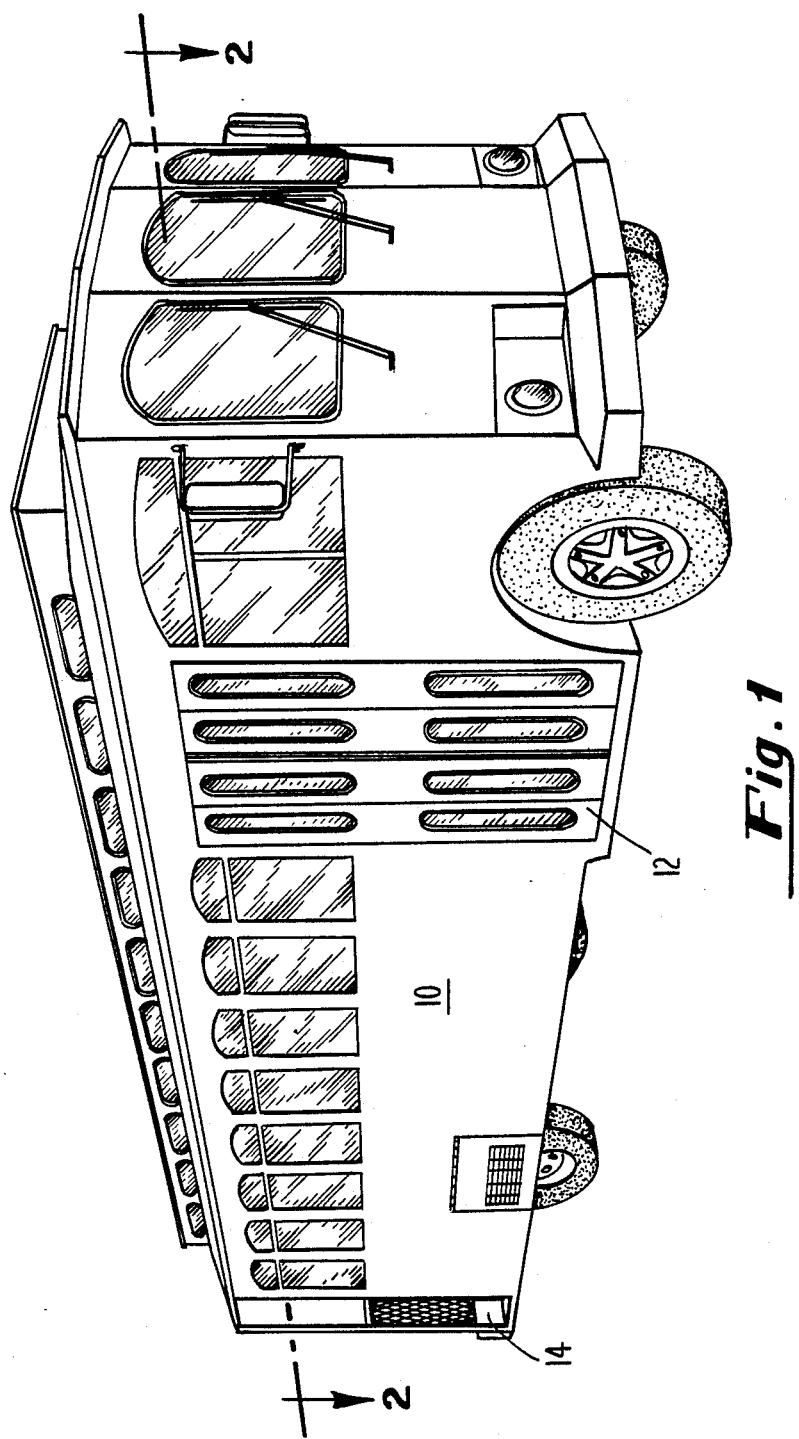
FIG. 1 is a perspective view of the exterior of the efficient food service vehicle comprising the present invention.

In its preferred embodiment this invention comprises, as shown in FIG. 1, a bus-like vehicle 10 with front entrance doors 12 and a rear exit passageway 14, near the front and back of the bus, respectively.

This allows for optimum customer access to food service counters as shown in the floor plan, FIG. 2.

In FIG. 2, it is seen that vehicle 10 includes a front section including an engine compartment 16 and driver's cockpit 18. The entire remainder of the floor plan of the bus is devoted to food service and is particularly adapted to provide efficient food service to walk-through customers. Particularly, it is adapted to permit the service of a variety of foods in an appetizing and attractive manner, effectively facilitating service of a gourmet buffet at essentially any location remote to a food preparation facility.

As specifically shown in FIG. 2, food service vehicle 10 comprises customer front entrance doors 12, including steps 13 leading upwardly from near ground level to the level of the floor in the vehicle, a long aisleway 20 extending essentially along the entire length of the vehicle and a rear door exit 22 at the rear of the vehicle, exit 22 opening into rear exit passageway 14, which includes steps 15 permitting customers to return essentially to ground level. Food presentation or service counters 24 are disposed along aisleway 20 to permit self-service of food to customers and to present the food in counters 24 in an attractive and appetizing manner, typical of a gourmet buffet.

Preferably, as shown in FIG. 2, food service counters 24 are provided on both sides of aisleway 20.

Preferably also, food counters 24 include attendant-serviced segments 26 and 28. Food service counter segments 26 and 28 are specifically adapted to provide standing space 30 and 32 and food storage and final preparation areas, such as hot food storage area 36, meat storage surfaces 40a, 40b and 40c and display area 42.

In accordance with the efficient food service method of the present invention, the vehicle as shown in FIGS. 1 and 2 is used by permitting customers to enter entrance 12 whereupon each customer is provided with a plate or other food carrying implement. The customer then proceeds at will to be served hot food from attendant-food serving segment 26 and also, at will, to be served with sliced meat, such as roast beef, turkey or ham, appropriately embellished with sauces from selected from surfaces 40a, 40b, and 40c, by an attendant at standing space 32 associated with attendant-service food display area 42. A customer then proceeds along the remainder of food service counters 24 on either side of aisleway 20 and exits through rear exit 22 and rear entrance passageway 14.

Preferably, cabinets are provided under food service counters 24 including both hot and cold food storage cabinets 25. Thus food service vehicle 10 of this invention can be provisioned with all the necessary beverages, hot foods and replenishment supplies for the food to be served in a remote food storage facility. The mobility of food service vehicle 10 then permits it to be transported with all necessary prepared food and food serving implements to a location such as an office building, a specially equipped food service building with appropriate entrances and exits coordinated with the corresponding entrances and exits of food service vehicle 10 (such as part of an airport terminal) or a general food service area as part of a golf tournament, wedding or other such event. Once transported there, food service vehicle 10 is properly equipped by removing the stored food and placing it in appropriate food serving positions on food service counter 24 and surfaces 40a, b and c. Food service vehicle 10 including food service attendants positioned in spaces 30 and 32 is then prepared to receive a volume of food service customers who pass through the vehicle relatively quickly and efficiently and in the course of traversing aisle 20 are quickly served with a variety of hot and cold food and beverages. Most importantly, food service vehicle 10 facilitates the transportation, storage, and presentation of a substantial variety of hot and cold food and beverages in an attractive and appetizing way, typical of a gourmet buffet.

In one embodiment of the invention, vehicle 10 is combined with a structure 50, typically a dining area of an office building or airport terminal, having an exit 52 and an entrance 54 spaced to correspond to that of the entrance 12 and exit passageway 14 of vehicle 10. In this manner vehicle 10 and the mating structure 50 are adapted to permit vehicle 10 to pull alongside of the structure 50 and position itself so that customers in the structure can leave the structure through exit 52 directly into the entrance 12 of vehicle 10 and then, upon exiting vehicle 10, to proceed directly back into the structure through the structure entrance 54 spaced to correspond to the location of exit passageway 14.

The present invention has been described with reference to specific embodiments. It should be understood that it is not limited thereto. Therefore, the claims which follow are intended to be construed to encompass the invention in its full scope including such modified form s or variants thereof as may be devised by those skilled in the art and should not be considered as limited to the literal terms of these claims.

What is claimed is:

1. A wheeled food service vehicle comprising:
   a customer entrance door at one end of the vehicle,
   a customer exit door at the other end of the vehicle,
   a customer aisleway extending from the entrance door to the exit door, and
   prepared food presentation counters along said aisleway adapted to facilitate serving a buffet-style meal to the customers as they traverse said vehicle from said entrance door through said aisleway and to said exit door,
   said counters including at least one attendant-served counter and at least one self-service counter with hot and cold food storage cabinets adjacent said self-service counter.

2. A food service vehicle as recited in claim 1, wherein said vehicle is a bus.

3. A food service vehicle as recited in claim 1, wherein the aisleway extends along the center of the vehicle with food service counters along both sides of the aisleway.

4. A food service vehicle as recited in claim 3, wherein said vehicle is a bus.

5. A method for preparing food at one location and serving said food at a second location as both a buffet and an attendant-served meal in an efficient and attractive manner comprising, at said one location, placing prepared food suitable for serving a buffet meal in hot and cold food storage cabinets under at least one buffet food counter disposed along the length of an aisle extending substantially along the length of a wheeled vehicle having at least one customer entrance and at least one customer exit door at the front and rear thereof and transporting the vehicle to said second location, removing the prepared food from the storage cabinets and placing it on said at least one buffet food counter in a manner to facilitate the serving of a buffet meal then permitting customers to enter the entrance door, and permitting said customers then to pass through the vehicle from the entrance door along the aisleway and along the service counter and toward the exit door and serving them stored food by attendants and then letting the customers choose buffet entrees in a self-service manner at said at least one counter in the course of their traverse of the vehicle along said aisleway.

6. A method as recited in claim 5 wherein attendant-served hot food and attendant-served meat are also dispensed at service locations located along the service counters in the vehicle.

7. A food service vehicle as recited in claim 1 wherein said entrance and said exit doors are spaced to correspond to entrance and exit door spacing of a building to facilitate customer movement.

8. A method, as recited in claim 5, wherein said customers are provided with a plate as they enter the entrance door and upon which plate said customers place selected food as said food is served to them.

* * * * *